Nov. 18, 1924.

E. L. CLARK 1,515,999

PRESSURE RETAINING VALVE

Filed Feb. 2 1923

Inventor
Eddy L. Clark
by his Attorney
John F. Nolan

Patented Nov. 18, 1924.

1,515,999

UNITED STATES PATENT OFFICE.

EDDY L. CLARK, OF WEST PITTSTON, PENNSYLVANIA.

PRESSURE-RETAINING VALVE.

Application filed February 2, 1923. Serial No. 616,460.

*To all whom it may concern:*

Be it known that I, EDDY L. CLARK, a citizen of the United States, and resident of West Pittston, in the county of Luzerne and State of Pennsylvania, have invented certain new and useful Improvements in Pressure-Retaining Valves, of which the following is a specification.

This invention relates to pressure retaining valves, having reference more particularly to valves for use in connection with the air-brake systems of railroad cars.

The object of my invention is to provide a pressure retaining valve of simple, durable and efficient construction having a valve element that can be readily mounted within the valve case and adjusted to resist any required pressure; such a valve that will effectually maintain its seat under varying conditions of service, and such a valve wherein the elements are readily removable and replaceable as occasion may require.

With these and other objects in view my invention comprises novel features of construction and combinations of parts which will be hereinafter described and claimed.

In the drawings—

Figure 1:
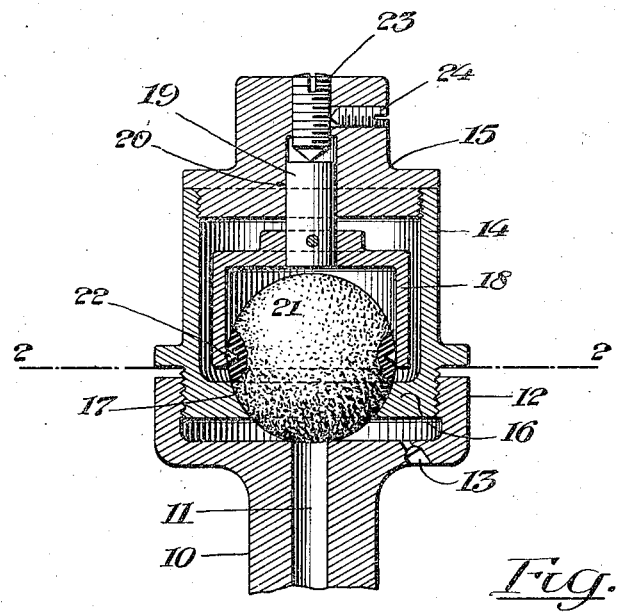
Figure 1 is a vertical section, partially in elevation, of a valve embodying a form of my invention.
Figure 2:
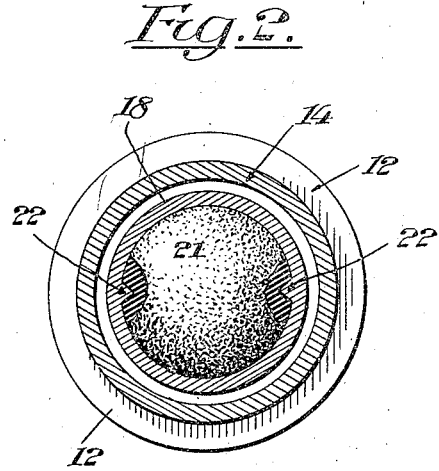
Fig. 2 is a horizontal section of the valve, as on the line 2—2 of Fig. 1.

Referring to the drawings, 10 designates a body having a central valve-controlled port 11 and adapted to be coupled, as usual, to the train pipe extending from the brake cylinder. The upper portion of this body is expanded and provided with a peripheral internally-threaded flange 12, and also with a suitably-disposed vent port 13.

On the upper end of the body is a valve case comprising a cylindrical shell 14 threaded at its lower end and screwed into the flange so as to be adjustable toward and from the top of the body, which top constitutes the bottom of the valve chamber. The upper end of the shell is internally threaded to receive a centrally perforated and threaded head 15, and the lower end of the shell is provided with an internal annular flange 16 which is formed to provide a concave bearing surface 17.

Within the valve chamber is contained a vertically movable valve element comprising an inverted cup-shaped shell 18 from the upper end of which a guide stem 19 centrally extends into the central perforation 20 of the head 15. Secured within the shell so as to project partially from the mouth of the latter is a ball 21 of elastic substance, such, for example, as rubber, which ball, in the present instance, is tightly held in place by means of inwardly projecting teats 22 at the mouth of the shell 18. The exposed portion of the ball is normally seated upon the concave bearing surface 17 of the annular flange 16, and the latter is so disposed in spaced relation to the floor of the valve chamber that the bottom of the ball depends below the flange and seals the mouth of the inlet port 11. The central perforation of the head 15 is provided with an adjusting element, preferably a set screw 23 which, bearing centrally upon the end of the stem 19, can be readily manipulated from the exterior of the valve in a manner to apply more or less pressure upon the ball through the interposed stem and its shell 18 according to the counteracting pressure in the brake cylinder. A lock-screw 24 mounted in and transversely of the head 15 serves to hold the set-screw in its positions of adjustment.

By the construction and arrangement above described it will be seen that the annular seat not only maintains the lower portion of the ball in accurate central register with the port 11, but it also affords for the lower portion of the ball a continuous lateral support that prevents distortion of the sealing surface of the ball when it is under pressure. At the same time the ball can be automatically raised by a predetermined pressure in the brake cylinder in order to establish communication between the inlet port 11 and the vent port 13.

It will also be seen that by vertically adjusting the valve case 14 on its supporting flange 12, the annular seat can be correspondingly adjusted in relation to the mouth of the inlet port 11 in order to permit the ball to be accurately supported in operative sealing relation to the port. Further that the ball is effectually seated upon the port not only when the pressure to the valve chamber is cut off but also when the valve is subjected to severe vibrations, or is set at various angles. The various parts of the valve can be readily assembled and can be as readily separated and reassembled for repairs or replacement.

Figure 3:
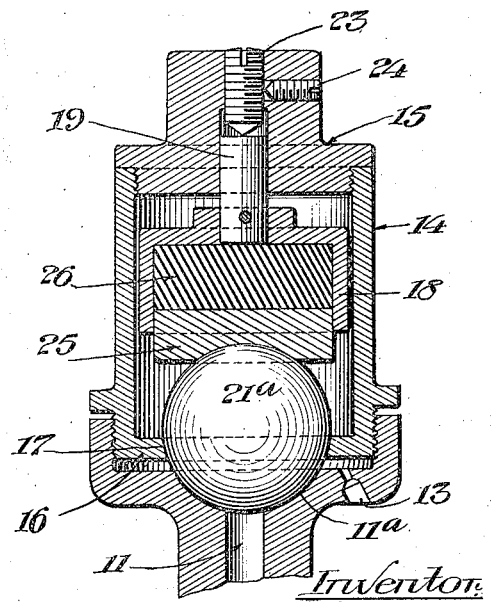
Fig. 3 is a vertical section of a modified form of the valve.

In Fig. 3 of the drawing I have illustrated a modification of my invention wherein a metal ball 21ª, which is encircled and laterally supported by the annular flange 16, rests upon a concave seat 11ª at the mouth of the inlet port 11. Bearing upon the top of the ball is the recessed face of a metal head 25 which is slidably fitted in the mouth of the cup 18 in opposition to the resilient action of a rubber body 26 contained in the space between the head 25 and the top of the cup, whereby when the set-screw 23, which bears upon the guide stem 19, is properly adjusted the requisite yielding pressure will be exerted by the body 26 upon the head 25 and perforce upon the ball.

While I have herein described my improved valve as designed for use in connection with air-brake systems it is to be understood that a valve embodying my invention may be adapted to other purposes. It is also to be understood that I do not limit my invention to the details of construction herein disclosed, as the device may be modified within the principle of the invention and the scope of the appended claims.

I claim—

1. The combination with a valve case having a port and an annular seat slightly spaced from said port, of a ball whereof the sealing portion is supported on and encircled by said seat and extends into sealing relation with the port, and means for varying the pressure of the ball upon the port.

2. The combination with a valve case having a port and an annular seat slightly spaced from said port, of a ball whereof the sealing portion is supported on and encircled by said seat and extends into sealing relation with the port, and means for varying the pressure of the ball upon the port, said means including a member operable from the exterior of the valve case.

3. The combination with a valve case having a port, and an annular seat spaced from said port, of a valve element comprising a supporting member, an elastic body carried by and projecting from said member, the projecting portion of the body being supported on and encircled by the seat and extending into sealing relation with the port, and means for applying pressure upon the said supporting member.

4. The combination with a valve case having a port, and an annular seat spaced from said port, of a valve element comprising a supporting member, a guide stem thereon extending into the top of the valve case, and an elastic ball carried by and projecting from said member, and an adjusting member fitted in the upper end of the case and bearing upon the said guide stem.

5. The combination with a valve case having a port and an annular seat slightly spaced from and adjustable in relation to said port, of a ball whereof the sealing portion is supported on and encircled by said seat and extends into sealing relation with said port, and means for varying the pressure of the ball upon the port.

6. The combination with a valve case having a port and an annular concave seat spaced from and adjustable in relation to said port, of a valve element comprising a supporting member, an elastic body carried by and projecting from said member, the projecting portion of the body being supported on and encircled by the seat and extending into sealing relation with the port, and means for applying pressure upon the said supporting body.

7. The combination with a valve case having a port and an annular seat spaced above said port, of a valve element having a convex sealing portion supported on and depending below said seat, and means for varying the pressure of the sealing portion upon said seat.

8. The combination with a valve case having a port and an annular seat spaced above said port, of a valve element comprising a supporting member and a sealing body carried by said member and having a convex portion supported on and depending below the said seat, and means for applying adjusted pressure upon the said supporting member.

9. The combination with a valve case having a port, and an annular seat spaced above said port, of a valve element comprising a supporting member, a guide stem thereon extending into the top of the valve case, and a sealing body carried by said member and having a convex portion supported on and depending below said seat, and means for applying adjusted pressure upon the said guide stem.

Signed at Pittston in the county of Luzerne and State of Pennsylvania this 30th day of January, A. D. 1923.

EDDY L. CLARK.